United States Patent
Kang et al.

(10) Patent No.: US 9,419,533 B2
(45) Date of Patent: Aug. 16, 2016

(54) VOLTAGE ADAPTER SYSTEMS FOR USE IN AN APPLIANCE

(71) Applicant: General Electric Company, Schenectady, NY (US)

(72) Inventors: Xingde Kang, Shanghai (CN); Brice Alan Bowley, Goshen, KY (US); Lauren Kolegraff, Prospect, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 60 days.

(21) Appl. No.: 14/466,155

(22) Filed: Aug. 22, 2014

(65) Prior Publication Data

US 2015/0116026 A1    Apr. 30, 2015

(30) Foreign Application Priority Data

Oct. 31, 2013    (CN) .......................... 2013 1 0527315

(51) Int. Cl.
*H02M 5/257* (2006.01)
*H02M 1/34* (2007.01)

(52) U.S. Cl.
CPC ...... *H02M 5/2573* (2013.01); *H02M 2001/348* (2013.01)

(58) Field of Classification Search
CPC .............. H02M 1/083; H02M 5/2573; H02M 2001/0003
USPC ................................................ 327/452, 455
See application file for complete search history.

(56) References Cited

U.S. PATENT DOCUMENTS

| | | | | |
|---|---|---|---|---|
| 5,942,814 A * | 8/1999 | Sutterlin | ............. | H02J 13/0048 307/125 |
| 6,091,218 A | 7/2000 | Ritch | | |
| 7,902,769 B2 * | 3/2011 | Shteynberg | ........ | H05B 33/0815 315/291 |
| 8,294,379 B2 * | 10/2012 | Liu | ..................... | H05B 33/0809 315/224 |
| 8,606,136 B2 * | 12/2013 | Shimura | ............. | G01R 19/165 399/67 |
| 8,866,403 B2 * | 10/2014 | Nerone | .............. | H05B 33/0815 315/244 |
| 2011/0012528 A1 | 1/2011 | Tsui et al. | | |
| 2011/0012530 A1 * | 1/2011 | Zheng | ................ | H05B 33/0815 315/294 |

OTHER PUBLICATIONS

"DIAC." www.inele.ufro.cl. Electrical Engineering Department—Universidad de La Frontera. Sep. 16, 2013, 4 pages.

* cited by examiner

*Primary Examiner* — Kenneth B Wells
(74) *Attorney, Agent, or Firm* — Dority & Manning, P.A.

(57) ABSTRACT

Voltage adapter systems for use in an appliance are provided. An exemplary voltage adapter system can include a TRIAC. The exemplary voltage adapter system can include a voltage detection circuit configured to detect an input voltage of an alternating current power signal and connect the TRIAC in series with a load of the appliance when the input voltage is greater than a threshold voltage. The exemplary voltage adapter system can include a firing angle control circuit configured to provide a gate signal to a gate of the TRIAC when the alternating current power signal reaches a phase angle. An exemplary firing angle control circuit can include a resistor, a capacitor, and a DIAC. The exemplary firing angle control circuit can be configured to trigger the TRIAC when the voltage across the capacitor exceeds a breakover voltage associated with the DIAC.

17 Claims, 5 Drawing Sheets

VOLTAGE ADAPTER SYSTEMS FOR USE IN AN APPLIANCE

FIELD OF THE INVENTION

The present disclosure relates to appliances or other electrical devices. More particularly, the present disclosure relates to voltage adapter systems that allow an appliance to operate using alternating current power at several different input voltages.

BACKGROUND OF THE INVENTION

One problem experienced by appliance manufacturers servicing various markets around the world is the non-standardized nature of utility power voltage. For example, in certain countries, such as the United States, wall outlets typically provide alternating current power of about 120 volts, while in certain other countries wall outlets can typically provide alternating current power at about 220 or 230 volts. As another example, even within the same region, available utility power can be 208 volts, 230 volts, or 265 volts.

One solution to this problem is for appliance manufacturers to provide several different configurations of the same appliance model that respectively correspond to the different input voltages. As an example, a manufacturer of packaged terminal air conditioner units can provide both a first model configuration with components capable of operating at lower input voltage levels and a second model configuration with components capable of operating at a higher input voltage level.

However, this solution is inefficient from a manufacturing, inventory, and distribution perspective. For example, the manufacturer can be required to maintain different stock keeping units for each model configuration, in effect doubling the number of stock keeping units when two model configurations are offered and introducing a level of redundancy. As another example, inventory tracking, sales, distribution, and other business activities must be managed for each configuration, rather than for a single appliance product as a whole.

Another attempted solution to the problem of non-standardized utility power voltage is for each appliance unit to include one or more transformers for transforming the alternating current power from the input voltage to a different voltage when required. However, transformers are large in size and expensive in cost. Therefore, inclusion of a transformer in each appliance unit is an impractical solution, as it would raise product costs and size.

Therefore, cost-effective voltage adapter systems that allow an appliance to operate using alternating current power at several different input voltages are desirable.

BRIEF DESCRIPTION OF THE INVENTION

Aspects and advantages of the invention will be set forth in part in the following description, or may be obvious from the description, or may be learned through practice of the invention.

One aspect of the present disclosure is directed to a voltage adapter system for use in an appliance. The voltage adapter system includes a TRIAC. The voltage adapter system includes a voltage detection circuit configured to connect the TRIAC in series with a load of the appliance when an input voltage of an alternating current power signal is greater than a threshold voltage. The voltage adapter system includes a firing angle control circuit configured to provide a gate signal to a gate of the TRIAC when the alternating current power signal reaches a phase angle.

Another aspect of the present disclosure is directed to a voltage adapter circuit. The voltage adapter circuit includes a TRIAC positioned in series with a load of a device. The voltage adapter circuit includes a firing angle control circuit. The firing angle control circuit includes one or more resistors providing a variable resistance. The firing angle control circuit includes a capacitor in series with the one or more resistors and downstream a path of current flow with respect to the one or more resistors. The one or more resistors and the capacitor are in parallel with the TRIAC. The firing angle control circuit includes a DIAC connected between the one or more resistors, the capacitor, and a gate of the TRIAC. The voltage adapter circuit includes a resistance control circuit configured to adjust the variable resistance based on one or more operational characteristics associated with the device. The firing angle control circuit is configured to provide a gate signal to the gate of the TRIAC when a voltage across the capacitor exceeds a breakover voltage associated with the DIAC.

Another aspect of the present disclosure is directed to an appliance capable of operating using alternating current power at a plurality of different input voltages. The appliance includes a load and a TRIAC selectably connectable in series with the load. The appliance includes a firing angle control circuit configured to trigger the TRIAC when the alternating current power reaches a predetermined phase angle. The firing angle control circuit includes a capacitor and a DIAC. The firing angle control circuit is configured to trigger the TRIAC when the voltage across the capacitor exceeds a breakover voltage associated with the DIAC.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
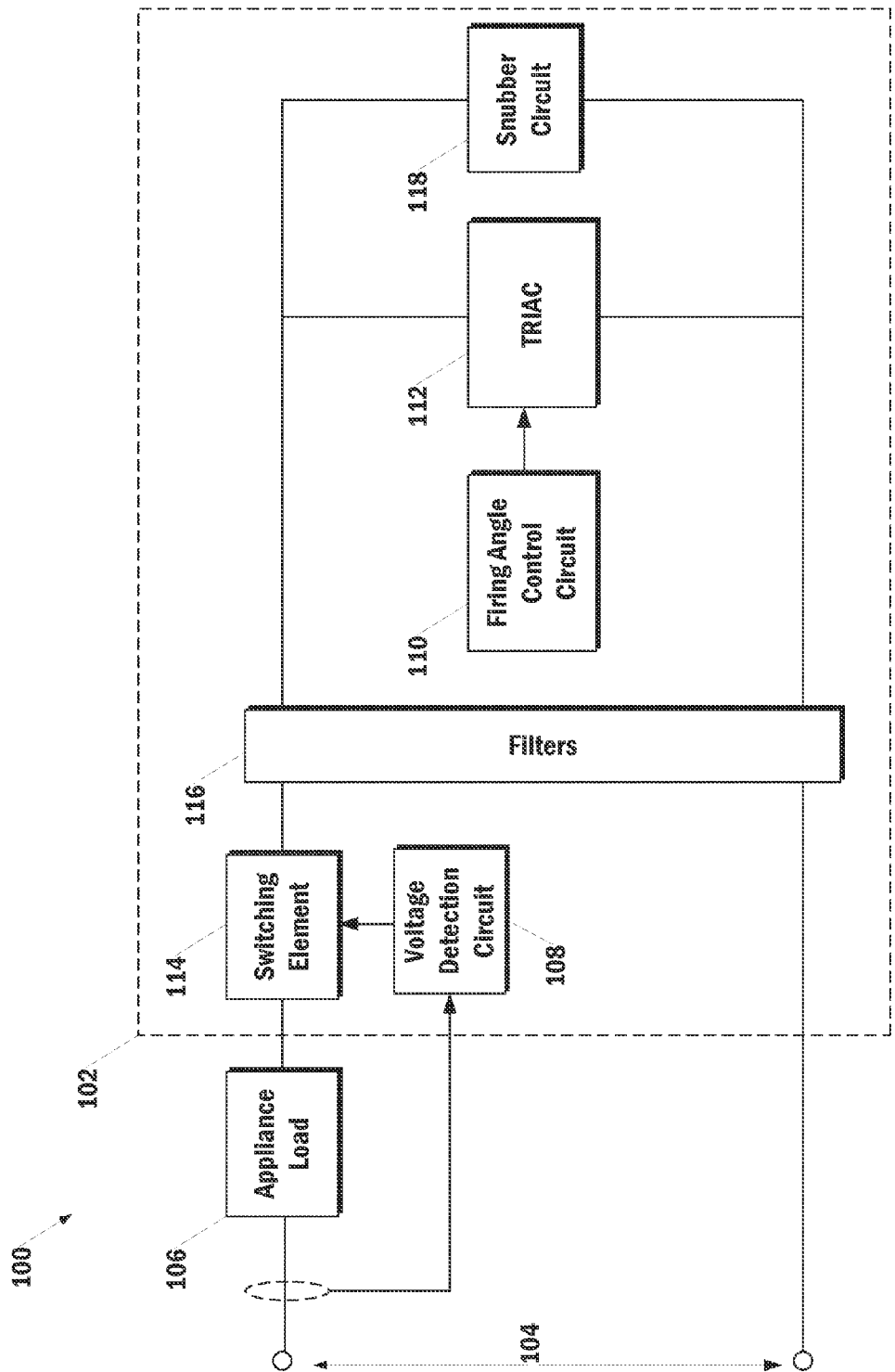
FIG. 1 depicts a block diagram of an exemplary appliance including an exemplary voltage adapter system according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

With reference now to the Figures, exemplary embodiments of the present disclosure will be discussed in further detail. FIG. 1 depicts a block diagram of an exemplary appliance 100 including an exemplary voltage adapter system 102 according to an exemplary embodiment of the present disclosure.

Voltage adapter system 102 can be selectively used to enable appliance 100 to operate using alternating current power at several different input voltages. In particular, such alternating current power signal can be input or otherwise provided to conductors 104. For example, appliance 100 can receive the alternating current power from a wall socket or other utility connection.

Appliance 100 can be any device for performing a particular task or functionality. As an example, appliance 100 can be an air conditioner, a clothes dryer, a clothes washer, a dishwasher, a refrigerator, a heater, an oven, a water heater, or any other suitable appliance. In particular, in some embodiments, appliance 100 can be a combination packaged terminal air conditioner and packaged terminal heat pump.

Appliance 100 includes an appliance load 106. Appliance load 106 can be any components that serve to provide or effectuate the functionality of appliance 100. For example, in the instance in which appliance 100 is a combined air conditioning and heating unit, appliance load 106 can include a fan motor, a compressor, one or more heating elements, or other suitable components. Appliance load 106 can exhibit a load character. The load character can include a total resistance, a total inductance, or other characteristics. Further, the load character can vary during operation of appliance 100 as various components of appliance load 106 are utilized or operated.

Voltage adapter system 102 can include a voltage detection circuit 108, a firing angle control circuit 110, and a TRIAC 112. Voltage detection circuit 108 can be configured to connect voltage adapter system 102 in series with appliance load 106 when an input voltage of the alternating current power signal exceeds a threshold value. As an example, the voltage detection circuit 108 can analyze a current across a shunt resistor positioned in the path of current flow across appliance load 106 to determine the input voltage. As another example, a voltage transformer or other measurement instrument can be used to determine the input voltage.

Voltage detection circuit 108 can control a switching element 114 to selectably connect voltage adapter system 102 in series with appliance load 106. For example, switching element 114 can be a switch, a relay, a semiconductor device, or other switching element. As an example, voltage detection circuit can connect voltage adapter system 102 in series with appliance load 106 when the input voltage exceeds about 253 volts. Although not explicitly depicted in FIG. 1, it will be appreciated that appliance 100 includes circuitry such that appliance load 106 can receive operating power when voltage adapter system 102 is disconnected or otherwise not connected in series with appliance load 106.

Firing angle control circuit 110 can be configured to provide a gate signal to TRIAC 112 when the alternating current power signal reaches a particular phase angle. In particular, firing angle control circuit 110 can be configured to provide a gate signal to a gate of TRIAC 112 such that TRIAC 112 is triggered to permit conduction of current. The principles of operation of a TRIAC are known to one of skill in the art and will not be discussed in detail here.

Figure 2:
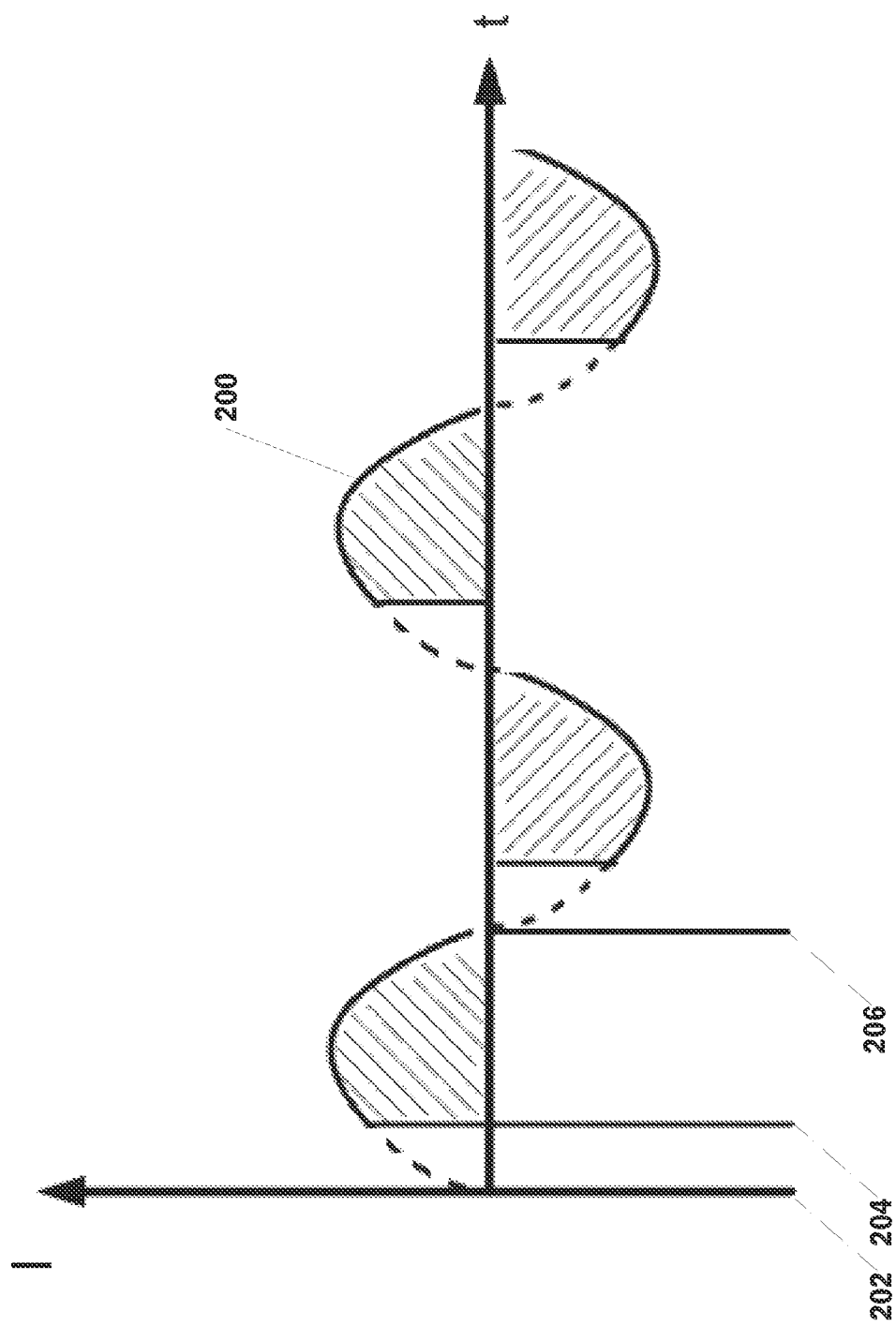
FIG. 2 depicts an exemplary waveform of current through a load according to an exemplary embodiment of the present disclosure.

In such fashion, when voltage adapter system 102 is connected in series with appliance load 106, firing angle control circuit 110 can control the flow of current through appliance load 106 by selectively triggering TRIAC 112. To illustrate this principle, FIG. 2 depicts an exemplary waveform 200 of current through a load according to an exemplary embodiment of the present disclosure.

In particular, waveform 200 depicts a reduction in the total power dissipated by the load as a result of controlling a TRIAC to selectively allow current flow through the load. At time 202 the TRIAC can remain untriggered or otherwise blocking current flow. However, at time 204 the TRIAC can be triggered, thereafter allowing current flow until time 206. In such fashion, the total power dissipated by the load can be reduced to substantially equal the total power dissipation that would occur if an alternating current of a lower input voltage was allowed to power the load in an unimpeded fashion.

In other words, as will be understood by one of skill in the art in light of the disclosures provided herein, by selectively controlling the firing angle at which the TRIAC allows current to begin flowing, the root mean square of an alternating current power signal of a higher input voltage can be reduced to substantially equal the root mean square of an alternating current power signal of a lower input voltage.

Returning to FIG. 1, voltage adapter system 102 can further include one or more filtering components 116 and a snubber circuit 118. Snubber circuit 118 can be used to reduce peak voltages associated with the switching of TRIAC 112.

Figure 3:
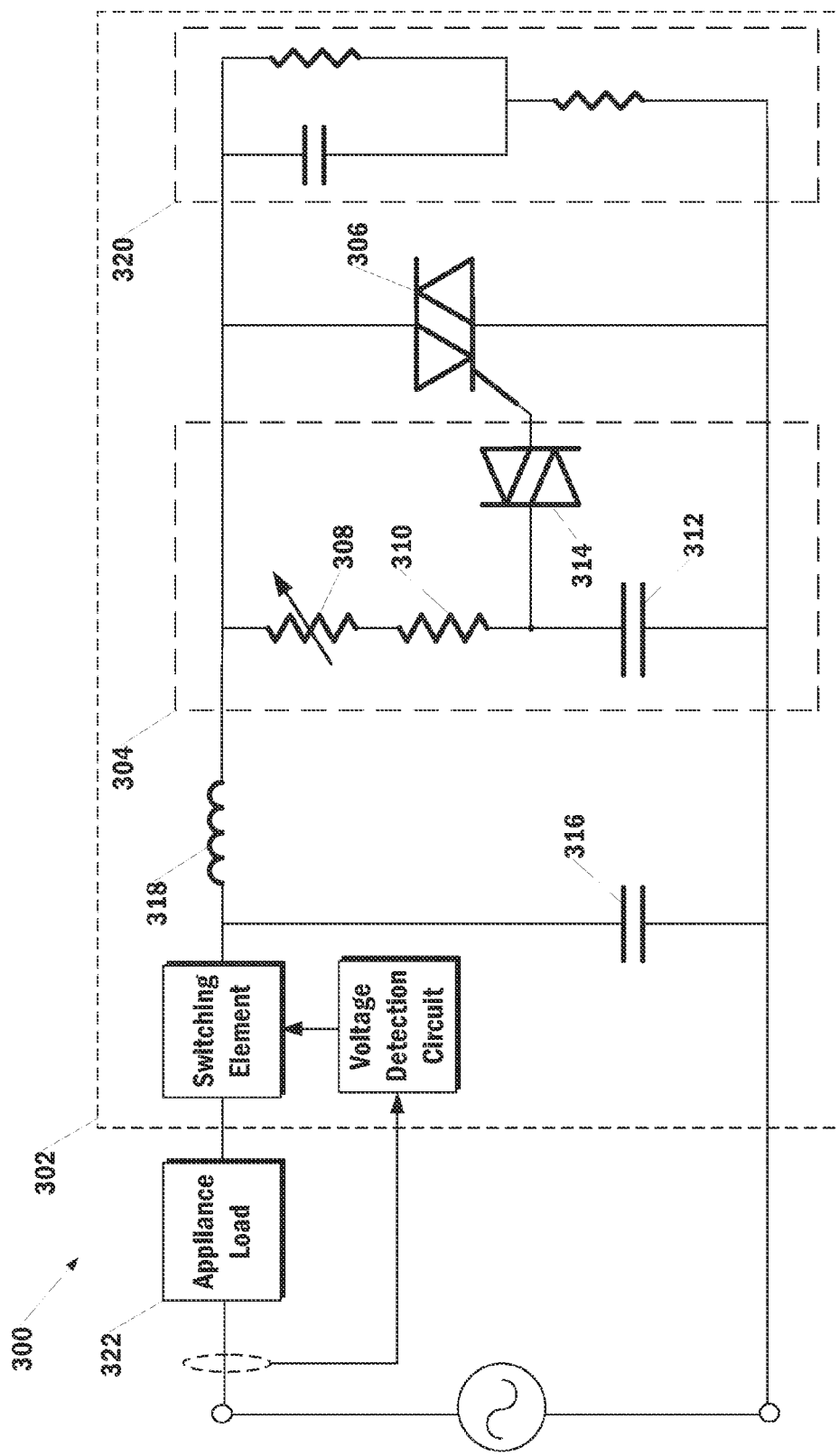
FIG. 3 depicts a schematic diagram of an exemplary voltage adapter system according to an exemplary embodiment of the present disclosure.

FIG. 3 depicts a schematic diagram 300 of an exemplary voltage adapter system 302 according to an exemplary embodiment of the present disclosure. Voltage adapter system 302 can be selectively connected in series with an appliance load 322. Voltage adapter system 302 can include a firing angle control circuit 304 and a TRIAC 306.

Firing angle control circuit 304 can include a first resistor 308, a second resistor 310, a capacitor 312, and a DIAC 314. First resistor 308 can optionally be a variable resistor that provides a variable resistance. As another example, first resistor 308 can be a plurality of resistors (e.g. a resistor array) that are selectively connectable in various parallel combinations to provide a variable resistance. However, in some implementations, first resistor 308 is not required to provide a variable resistance. Second resistor 310 can provide an additional resistance and is optional.

Capacitor 312 can be connected in series with first resistor 308 and can be positioned downstream a path of current flow with respect to first resistor 308. First resistor 308 and capacitor 312 can together be connected in parallel with TRIAC 306. DIAC 314 can be connected between second resistor 310, capacitor 312 and a gate of TRIAC 306.

Firing angle control circuit 304 can be configured to provide a gate signal to TRIAC 306 when an alternating current power signal reaches a particular phase angle. In particular, capacitor 312 can be charged by current flowing through first resistor 308 and second resistor 310, thereby increasing a voltage present across capacitor 312. When the voltage across capacitor 312 is greater than a breakover voltage associated with DIAC 314, DIAC 314 will permit the flow of electricity and therefore provide the gate signal to TRIAC 306.

Thus, the amount of resistance and capacitance respectively provided by first resistor 308 and capacitor 312 and the breakover voltage of DIAC 314 can be varied to adjust a firing angle at which TRIAC 306 is triggered. In particular, by increasing the resistance provided by first resistor 308, capacitor 312 can be charged in a slower fashion, as the increased resistance will result in decreased current flow to capacitor 312. Therefore, the phase angle at which the voltage across capacitor 312 exceeds the breakover voltage of DIAC 314 will be greater (e.g. will occur later in the alternating current power signal cycle).

Thus, increasing the amount of resistance provided by first resistor 308 can result in a later firing angle at which TRIAC 306 is triggered. A later firing angle will result in a more significant decrease in current flow through appliance load 322 and, therefore, a greater reduction in total power dissipation. Likewise, reducing the resistance provided by first resistor 308 can result in an earlier firing angle, greater current flow through appliance load 322, and, therefore, a less significant reduction in total power dissipation.

Furthermore, in some implementations, an expected load character exhibited by appliance load 322 can be taken into account when selecting the component values used in firing angle control circuit 304. As an example, a load which is more inductive can result in positive current flow even after the voltage of the alternating current power signal has dropped to zero or gone negative. In particular, this effect is generally known as a lagging current in alternating current systems. Likewise, a load which is more capacitive can result in a leading current.

Thus, in some implementations of the present disclosure, an expected load character associated with the appliance load can be taken into account when selecting the firing angle at which firing angle control circuit 304 triggers TRIAC 306. As an example, in an appliance with an expected load character that is inductive, the firing angle can be increased so as to account for or otherwise offset the lagging current that will remain positive even after the voltage of the alternating current power signal has decreased to zero. Likewise, as another example, in an appliance with an expected load character that is capacitive, the firing angle can be decreased (e.g. triggered at an earlier phase angle of the alternating current power signal) so as to account for or otherwise offset the leading current. In addition, in some implementations, all potential load character ranges that can be achieved by various operation of the appliance can be considered and an optimal firing angle or other component parameters can be determined in light of such potential ranges.

Furthermore, as will be discussed further with reference to FIG. 4, in some implementations, the firing angle at which a TRIAC is triggered can be adjusted during operation of an appliance to account for changes in load character as the appliance is operating.

Referring again to FIG. 3, voltage adapter system 302 can further include a filter capacitor 316, a filter inductor 318, and a snubber circuit 320.

Figure 4:
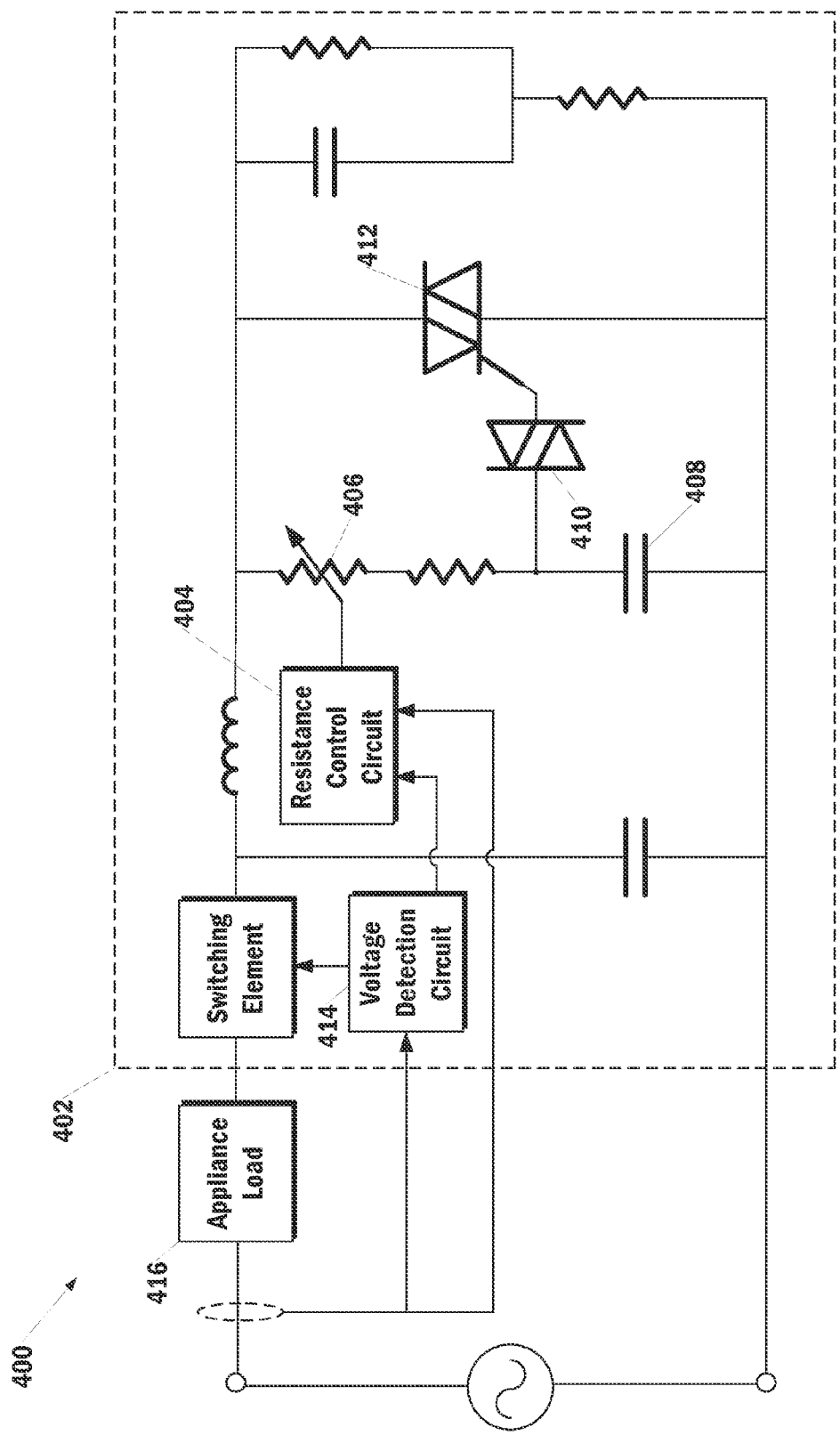
FIG. 4 depicts a schematic diagram of an exemplary voltage adapter system according to an exemplary embodiment of the present disclosure.

FIG. 4 depicts a schematic diagram 400 of an exemplary voltage adapter system 402 according to an exemplary embodiment of the present disclosure. Voltage adapter system 402 can be selectively connected in series with an appliance load 416 by a voltage detection circuit 414. In particular, voltage adapter system 402 can include a resistance control circuit 404, a resistor 406, a capacitor 408, a DIAC 410, and a TRIAC 412. Resistor 406, capacitor 408, and DIAC 410 can operate to provide a gate signal to TRIAC 412 at a particular firing angle, as discussed with respect to firing angle control circuit 304 of FIG. 3.

Referring again to FIG. 4, as an example, resistor 406 can be a single variable resistor providing a variable resistance. As another example, resistor 406 can be a plurality of resistors (e.g. a resistor array) that are selectively connectable in various parallel combinations to provide a variable resistance. For example, resistance control circuit 404 can provide signals to various switching elements or integrated chips to connect or disconnect selected ones of the plurality of resistors.

According to an aspect of the present disclosure, resistance control circuit 404 can be configured to adjust the variable resistance provided by resistor 406 during operation of an appliance. As an example, resistance control circuit 404 can be configured to adjust the variable resistance provided by resistor 406 based on an input voltage of an alternating current power signal provided to the appliance. Resistance control circuit 404 can determine the input voltage of the alternating current power signal itself, or can receive an indication of the input voltage from voltage detection circuit 414.

As an example, when the input voltage exceeds a threshold value, voltage adapter system 402 can be connected in series with appliance load 416 and operated so as to reduce the root mean square through appliance load 416 to substantially mimic an alternating current power signal having a lower input voltage. In particular, such lower input voltage can be treated as a target voltage. For example, if the actual input voltage of the alternating current power signal voltage is about 265 volts, voltage adapter system 402 can be operated to reduce power dissipation by appliance load 416 to substantially mimic operation at a target input voltage of about 230 volts.

However, a degree of fluctuation or error may still be present in the alternating current power signal. As an example, the input voltage of the alternating current power signal may fluctuate up to 10 percent, so that the actual observed input voltage is about 291.5 volts. To offset such increase, resistance control circuit 404 can be configured to increase the variable resistance provided by resistor 406. As discussed above, increasing the variable resistance provided by resistor 406 can result in a greater firing angle at which TRIAC 412 is triggered, thereby resulting in a decrease in the amount of power dissipated by appliance load 416.

Thus, by increasing the variable resistance provided by resistor 406, the increase in the input voltage of the alternating current power signal can be accommodated or otherwise offset such that the root mean square through appliance load 416 remains substantially equal to the lower, target input voltage. Likewise, if the input voltage fluctuates downwards, resistance control circuit 404 can decrease the variable resistance provided by resistor 406 such that an earlier firing angle is provided to TRIAC 412 and the target input voltage is maintained.

As another example, resistance control circuit 404 can be configured to adjust the variable resistance provided by resistor 406 based on a load character associated with appliance load 416. For example, if the load character of appliance load 416 changes during operation of the appliance, then resistance control circuit 404 can actively adjust the variable resistance provided by resistor 406 so as to compensate for such change.

As an example, if the load character of appliance load 416 becomes more inductive in character during operation of the appliance, then resistance control circuit 404 can be configured to increase the variable resistance provided by resistor 406. As discussed above, increasing the variable resistance provided by resistor 406 can result in a later firing angle at which TRIAC 412 is triggered, thereby compensating for a lagging current. Likewise, if the load character of appliance load 416 becomes more capacitive, then resistance control circuit 404 can be configured to decrease the variable resistance provided by resistor 406, resulting in an earlier firing angle and compensating for a leading current.

In some implementations, the load character of appliance load 416 can be determined by analyzing a phase difference between the voltage and current of the alternating current power signal. For example, as discussed above, a load exhibiting an inductive load character can result in a lagging current in which peak current values occur after peak voltage values. Such a lagging current can therefore exhibit a positive phase difference. Likewise, a capacitive load character can result in a leading current in which peak current values occur prior to peak voltage values. Such a leading current can therefore exhibit a negative phase difference. Thus, by analyzing a phase difference between the voltage and current of the alternating current power signal, the load character of appliance load 416 can be determined.

As an example, in some implementations, resistance control circuit 404 can detect zero crossings across a shunt resistor positioned in the path of current flow to assist in determining the phase angle of the voltage. Further, resistance control circuit 404 can detect zero crossings of an output signal from a current transformer positioned around the path of current flow to assist in determining the phase angle of the current. Resistance control circuit 404 can compare the two phase angles to obtain a phase difference and adjust the variable resistance accordingly. In particular, if the phase difference increases in value, then resistance control circuit 404 can increase the variable resistance. Likewise, if phase difference decreases in value, then resistance control circuit 404 can decrease the variable resistance.

In some implementations, resistance control circuit 404 can include a microprocessor configured to receive input signals describing various operating characteristics, compute a target resistance to achieve a target firing angle based on the input signals, and adjust the variable resistance to the target resistance.

As an example, in some implementations, the resistance control circuit 404 can receive an input signal from the appliance that indicates an operating mode in which the appliance is currently operating. For example, in the instance in which the appliance is a combination packaged terminal air conditioner and packaged terminal heat pump, the appliance can operate in fan only mode, standby mode, cooling mode, heating mode, or other suitable modes or ranges of modes. Each operating mode can have a known load character associated with it. Thus, in such implementations, the resistance control circuit 404 can consult a lookup table to obtain a predetermined resistance that is optimized for the load character associated with each particular mode and then adjust the variable resistance to such predetermined value.

Figure 5:
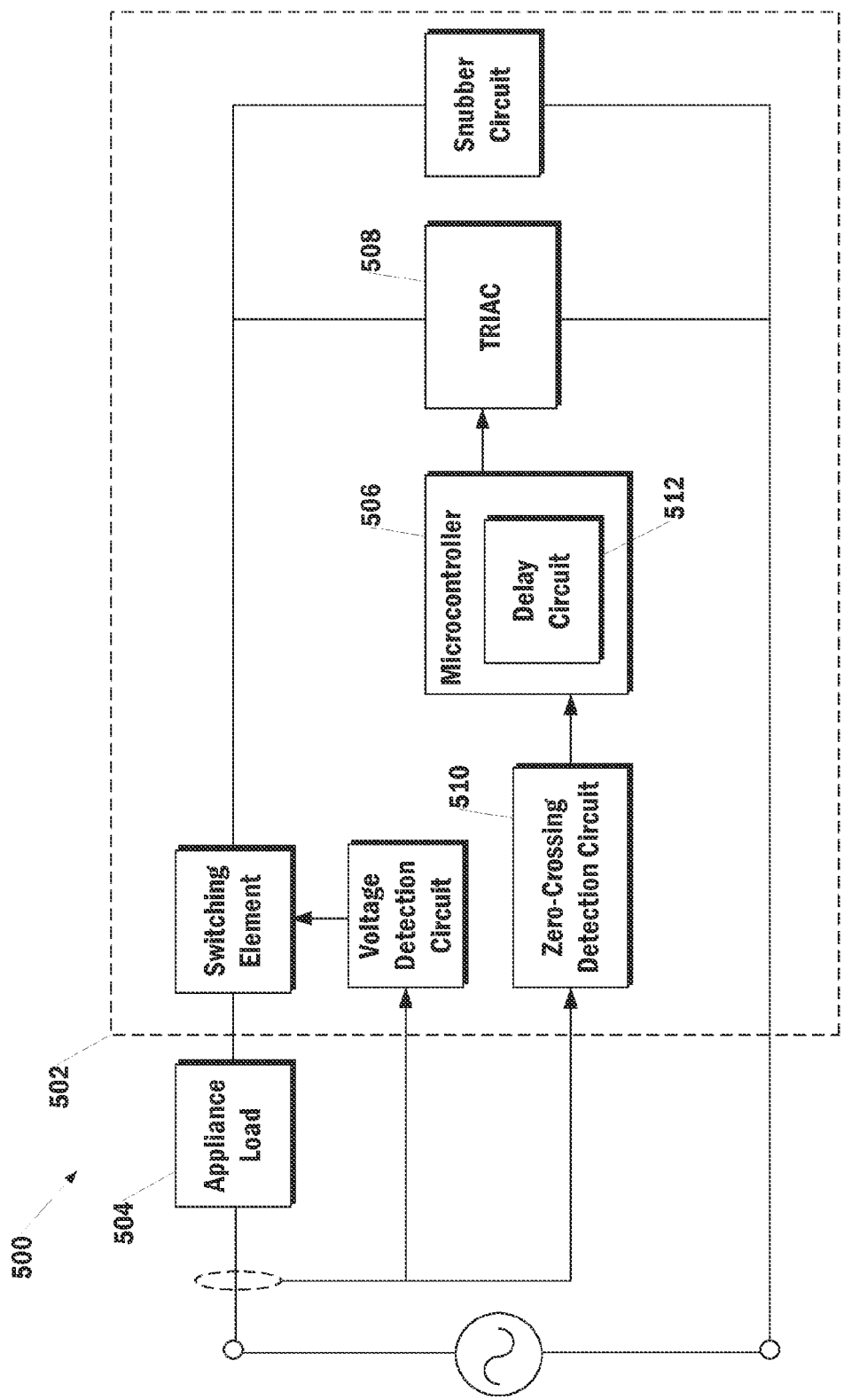
FIG. 5 depicts a schematic diagram of an exemplary voltage adapter system according to an exemplary embodiment of the present disclosure.

FIG. 5 depicts a schematic diagram 500 of an exemplary voltage adapter system 502 according to an exemplary embodiment of the present disclosure. In particular, voltage adapter system 502 can include a microcontroller 506 configured to provide a gate signal to a TRIAC 508 when an alternating current power signal reaches a particular phase angle. Microcontroller 506 can be or include one or more processors, one or more integrated circuits, or other components. Voltage adapter system 502 can be selectively connectable in series with appliance load 504.

Voltage adapter system 502 can further include a zero-crossing detection circuit 510 configured to detect zero-crossings of the alternating current power signal. For example, zero-crossing detection circuit 510 can analyze a voltage across a shunt resistor to detect zero-crossings. As another example, zero-crossing detection circuit 510 can include a voltage transformer or other measurement instrument to analyze the alternating current power signal. The zero-crossing detection circuit can provide a detection signal to microcontroller 506 at each instance in which a zero-crossing of the alternating current power signal is detected.

Microcontroller 506 can include or otherwise operate in conjunction with a delay circuit 512. In some implementations, the duration of the delay provided by delay circuit 512 can be adjustable. For example, microcontroller 506 can adjust the duration of the delay.

Voltage adapter system 502 can operate to reduce the root mean square through appliance load 504 by selectively triggering TRIAC 508 to control the flow of current through appliance load 504. As an example, voltage adapter system 502 can operate to control the flow of current as is shown in FIG. 2.

More particularly, for each instance in which the alternating current power signal crosses zero, the zero-crossing detection circuit 510 can provide a detection signal to microcontroller 506. Microcontroller 506 can operate delay circuit 512 to delay a particular duration of time, and then provide a gate signal to a gate of TRIAC 508 after the delay period has expired. In such fashion, the total power dissipated by appliance load 504 can be reduced to substantially equal the total power dissipation that would occur if an alternating current of a lower input voltage was allowed to power the load in an unimpeded fashion.

Further, microcontroller 506 can adjust the duration of the delay period provided by delay circuit 512 to compensate or adjust for changes in various operating parameters. In particular, by adjusting the duration of the delay period, microcontroller 506 can adjust the firing angle at which TRIAC 508 is triggered to permit the flow of current. As examples, microcontroller 506 can adjust the duration of the delay period based on the input voltage of the alternating current power signal, the load character of appliance load 504, or a phase difference between the voltage and current of the alternating current power signal.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A voltage adapter system for use in an appliance, the voltage adapter system comprising:
   a TRIAC;
   a switching element configured to connect the TRIAC in series with a load of the appliance when a voltage detection circuit detects an input voltage of an alternating current power signal is greater than a threshold voltage; and
   a firing angle control circuit configured to provide a gate signal to a gate of the TRIAC when the alternating current power signal reaches a phase angle;
   wherein the firing angle control circuit comprises:
   a resistor providing a resistance;
   a capacitor providing a capacitance, wherein the capacitor is located in series with the resistor and downstream a path of current flow with respect to the resistor; and a DIAC connected between the first resistor, the first capacitor, and the gate of the TRIAC;

wherein the resistor and the capacitor are connected in parallel with the TRIAC.

2. The voltage adapter system of claim 1, wherein the resistance and capacitance are determined based on the phase angle and a breakover voltage associated with the DIAC.

3. The voltage adapter system of claim 1, wherein the resistor providing the resistance comprises one or more resistors providing a variable resistance.

4. The voltage adapter system of claim 3, wherein the voltage adapter system further comprises a resistance control circuit configured to adjust the variable resistance based on the input voltage of the alternating current power signal.

5. The voltage adapter system of claim 3, wherein the voltage adapter system further comprises a resistance control circuit configured to adjust the variable resistance based on a total inductance associated with the load.

6. The voltage adapter system of claim 5, wherein the resistance control circuit is configured to increase the variable resistance when the total inductance associated with the load increases.

7. The voltage adapter system of claim 3, wherein the voltage adapter system further comprises a resistance control circuit configured to adjust the variable resistance based on an operating mode of the appliance.

8. The voltage adapter system of claim 1, wherein the firing angle control circuit comprises:

a zero-crossing detection circuit configured to detect zero-crossings of the alternating current power signal; and a microcontroller configured to provide the gate signal to the gate of the TRIAC after a delay period after the zero-crossing detection circuit detects a zero-crossing of the alternating current power signal.

9. The voltage adapter system of claim 8, wherein the delay period is adjustable.

10. The voltage adapter system of claim 1, wherein the appliance comprises an air conditioner.

11. The voltage adapter system of claim 1, wherein the alternating current power source exhibits a maximum magnitude of about 265 volts and the voltage adapter system reduces the root mean square voltage through the load to substantially equal a power signal exhibiting a maximum magnitude of about 230 volts.

12. A voltage adapter circuit comprising:

a TRIAC positioned in series with a load of a device;

a firing angle control circuit, the firing angle control circuit comprising:

one or more resistors providing a variable resistance;

a capacitor in series with the one or more resistors and downstream a path of current flow with respect to the one or more resistors, wherein the one or more resistors and the capacitor are in parallel with the TRIAC; and a DIAC connected between the one or more resistors, the capacitor, and a gate of the TRIAC; and a resistance control circuit configured to adjust the variable resistance based on one or more operational characteristics associated with the device;

wherein the firing angle control circuit is configured to provide a gate signal to the gate of the TRIAC when a voltage across the capacitor exceeds a breakover voltage associated with the DIAC;

wherein the one or more operational characteristics associated with the device comprises a load character associated with the load of the device.

13. The voltage adapter circuit of claim 12, further comprising a voltage detection circuit configured to detect an input voltage of an alternating current power signal and connect the TRIAC in series with the load when the input voltage is greater than a threshold voltage.

14. The voltage adapter circuit of claim 13, wherein the one or more operational characteristics associated with the device comprises the input voltage detected by the voltage detection circuit.

15. The voltage adapter circuit of claim 12, wherein the resistance control circuit comprises a microcontroller configured to adjust the variable resistance.

16. The voltage adapter circuit of claim 12, wherein the device is an air conditioner and wherein the voltage adapter circuit steps down the alternating current power signal from about 265 volts to about 230 volts.

17. An appliance capable of operating using alternating current power at a plurality of different input voltages, the appliance comprising:

a load;

a TRIAC selectably connectable in series with the load;

a firing angle control circuit configured to trigger the TRIAC when the alternating current power reaches a predetermined phase angle;

wherein the firing angle control circuit comprises a capacitor and a DIAC; and wherein the firing angle control circuit is configured to trigger the TRIAC when the voltage across the capacitor exceeds a breakover voltage associated with the DIAC;

wherein the firing angle control circuit further comprises one or more resistors connected in the path of current flow to the capacitor;

the one or more resistors provide an adjustable voltage; and the appliance is configured to adjust the adjustable voltage based on a phase difference between the voltage and current of the alternating current power.

* * * * *